W. J. FRANCKE.
FLEXIBLE COUPLING.
APPLICATION FILED FEB. 14, 1919.
1,343,121.
Patented June 8, 1920.
2 SHEETS—SHEET 2.
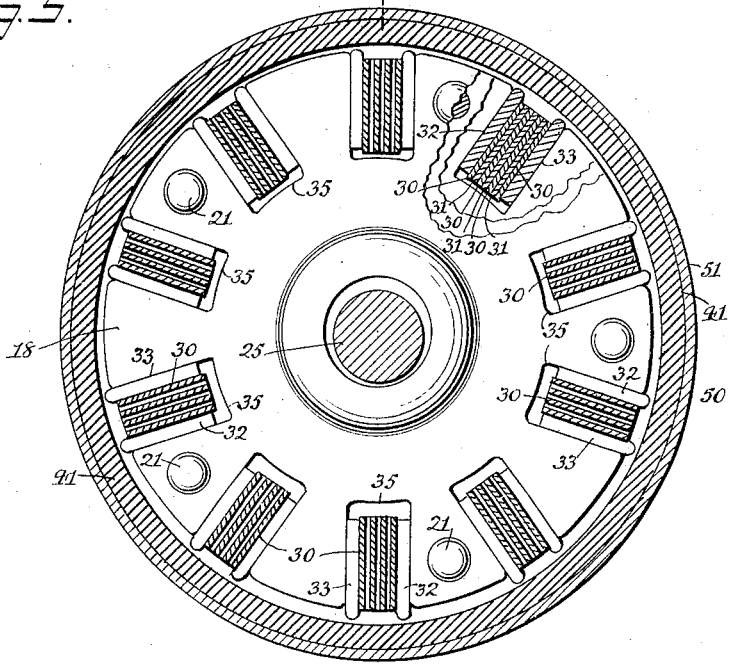
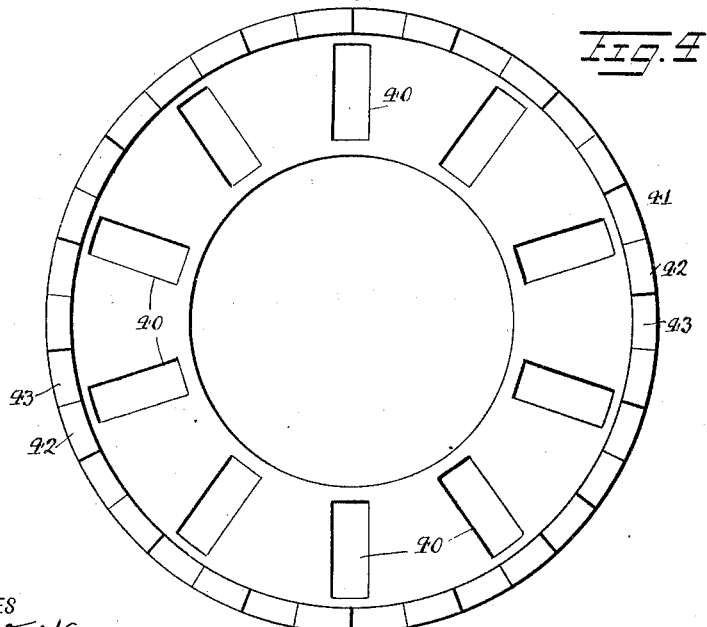
WITNESSES
H. T. Walker
INVENTOR
W. J. FRANCKE.
BY
ATTORNEYS

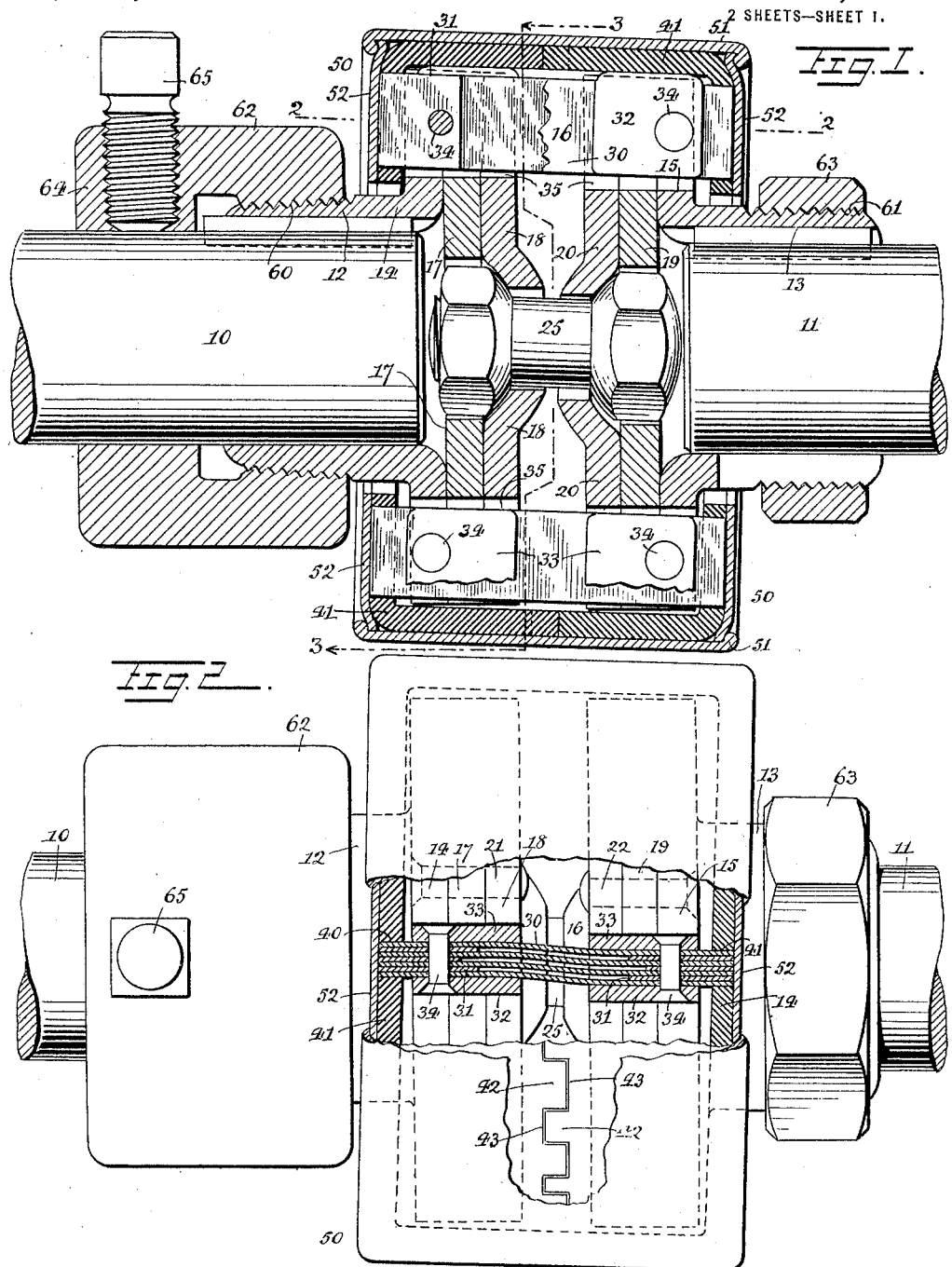

UNITED STATES PATENT OFFICE.

WILLIAM J. FRANCKE, OF HIGHLAND PARK, NEW JERSEY, ASSIGNOR TO THE FRANCKE CO., OF HIGHLAND PARK, NEW JERSEY, A CORPORATION OF NEW JERSEY.

FLEXIBLE COUPLING.

1,343,121.

Specification of Letters Patent.

Patented June 8, 1920.

Application filed February 14, 1919. Serial No. 276,933.

*To all whom it may concern:*

Be it known that I, WILLIAM J. FRANCKE, a citizen of the United States, and a resident of Highland Park, in the county of Middlesex and State of New Jersey, have invented a new and Improved Flexible Coupling, of which the following is a full, clear, and exact description.

The invention relates to flexible couplings such as shown and described in the Letters Patent of the United States, No. 1,029,355, granted to me June 11, 1912.

The object of the invention is to provide a new and improved flexible coupling arranged to prevent undue bending of the shims on starting the driven shaft and maintaining the full power of transmission when starting. Another object is to properly house the coupling to prevent dust and other extraneous matter from impairing the action of the flexible members.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a longitudinal central section of the flexible coupling on the line 1—1 of Fig. 3;

Fig. 2 is a plan view of the same with part of the floating member broken out and with part shown in section, on the line 2—2 of Fig. 1;

Fig. 3 is a cross section of the same on the line 3—3 of Fig. 1; and

Fig. 4 is a face view of one of the sections of the floating member.

On the adjacent ends of the two shafts 10 and 11 to be coupled together are keyed or otherwise fastened the hubs 12 and 13 of two coupling members 14 and 15 connected with each other by flexible connecting members 16 arranged in a circle, the center of which coincides with the axis of the corresponding shaft 10 or 11. The coupling members 14 and 15 are reinforced by pressed steel sections 17, 18 and 19, 20, respectively, preferably of disk form and connected with each other by rivets 21 and 22 or other similar fastening devices, as plainly indicated in Figs. 2 and 3. The members 18 and 20 are connected with each other centrally by a universal joint 25.

Each of the flexible connecting members 16 is formed of a plurality of flat steel shims 30 held spaced apart by interposed reinforcing and spacing shims 31, and the outer portions of the outermost main shims 30 are flanked by plates 32 and 33 and the several parts are fastened together by rivets 34 or similar fastening devices, as plainly indicated in Fig. 2. The plates 32 and 33 fit into corresponding openings 35 in the coupling members 14 and 15 and their reinforcing plates 17, 18 and 19, 20. The openings 35 permit radial movement of the outer ends of the flexible coupling members 16. The outer reinforced ends of the flexible connecting members 16 project beyond the outer faces of the coupling members 14 and 15 and engage openings 40 formed in the sides of a floating member 41 in the form of a casing inclosing the coupling members and their flexible connecting members 16. The floating member 41 is preferably made in two sections with the adjacent edges provided with interlocking tongues and grooves 42 and 43, to hold the sections against circumferential displacement. It will be noticed that by the arrangement described the floating member can readily assume an angular position, relative to the axes of the shafts 10 and 11, in case of misalinement thereof, but the floating member 41 connects the coupling members 14 and 15 with each other by the reinforced projecting outer ends of the flexible connecting members 16. It is understood that the outer reinforced flexible ends of the flexible connecting members 16 are less flexible than the spaced shims extending from one coupling member to the other. Thus when the driving shaft is started the transmission of power is practically direct by way of the reinforced outer ends of the flexible connecting member 16 and the floating member 41, and in case the shafts 10 and 11 are in parallel misalinement then the spaced connecting members yield more readily to the strain caused by the displacement of one shaft above the other, than a solid pack of shims.

The floating member 41 is incased in a casing 50 comprising a rim 51 having its edges crimped over ring-shaped side pieces 52 to hold the latter in place, the rim 51 fitting on the peripheral face of the floating member 41 and the sides 52 fitting exteriorly on the sides of the said floating member 41.

The hubs 12 and 13 are preferably split and provided with screw threads 60 and 61 on which screw nuts 62, 63 to hold the split hubs closed and clamped in position on the shafts 10 and 11. The nut 62 is provided with an extension 64 fitting onto the shaft 10 and provided with a set screw 65 for screwing the nut 62 to the shaft 10.

It is understood that parallel misalinement of shafts 10 and 11 bends the flexible connecting members 16 and this bending tilts the floating member 41 but is not aggravated on starting the driving shaft owing to the transmission of the power by way of the floating member 41, the outer comparatively stiff ends of the flexible members 16 and the coupling members 14 and 15. It will also be noticed that by separating the shims of each flexible member the shims have a greater range of flexing to readily compensate for misalinement of the shafts without causing undue binding in the shaft bearings.

Having thus described my invention, I claim as new and desire to secure by Letters Patent:—

1. In a flexible coupling, the combination of coupling members adapted to be secured to adjacent ends of two shafts, a floating member in the form of a casing inclosing the said coupling members, and flexible connecting members connecting the said coupling members with each other and connecting the said coupling members with the sides of the said floating member.

2. In a flexible coupling, the combination of coupling members adapted to be secured to the adjacent ends of two shafts, flexible connecting members connecting the said coupling members with each other and projecting beyond the same, and a floating member engaged by the projecting portions of the said flexible connecting members.

3. In a flexible coupling, the combination of coupling members adapted to be secured to the adjacent ends of two shafts, flexible connecting members connecting the said coupling members with each other and projecting beyond the outer sides thereof, and a floating member made in sections and inclosing the said coupling members, the said projecting ends of the flexible connecting members engaging the sides of the said floating member.

4. In a flexible coupling, the combination of coupling members adapted to be secured to the adjacent ends of two shafts, flexible connecting members connecting the said coupling members with each other and projecting beyond the outer sides thereof, and a floating member made in sections and inclosing the said coupling members, the said flexible connecting members being reinforced at their outer portions, the projecting ends of the said flexible connecting members engaging the sides of the said floating member.

5. In a flexible coupling, the combination of coupling members adapted to be secured to the adjacent ends of two shafts, flexible connecting members connecting the said coupling members with each other and projecting beyond the outer sides thereof, a floating member made in sections and inclosing the said coupling members, the said flexible connecting members being reinforced at their outer portions, the projecting ends of the said flexible connecting members engaging the sides of the said floating member, and a casing inclosing the said sectional floating member.

6. In a flexible coupling, the combination of coupling members adapted to be secured to the adjacent ends of two shafts, flexible connecting members connecting the said coupling members with each other and projecting beyond the outer sides thereof, each of the said flexible connecting members being formed of main shims, and spacing and reinforcing shims interposed between the outer ends of the main shims to space the latter apart and to reinforce the outer portions of each flexible connecting member and a floating member inclosing the said coupling members and engaged by the projecting and reinforced ends of the said flexible connecting members.

7. In a flexible coupling, the combination of coupling members adapted to be secured to the adjacent ends of two shafts, and flexible connecting members connecting the said coupling members with each other, each flexible connecting member being formed of a plurality of main shims spaced apart throughout their lengths.

8. In a flexible coupling, the combination of coupling members adapted to be secured to the adjacent ends of two shafts, flexible connecting members connecting the said coupling members with each other, each flexible connecting member being formed of a plurality of main shims spaced apart throughout their lengths, and reinforcing and spacing shims interposed between the said main shims at the outer portions thereof.

9. In a flexible coupling, the combination of coupling members adapted to be secured to the adjacent ends of two shafts, flexible connecting members connecting the said coupling members with each other, each flexible connecting member being formed of a plurality of main shims spaced apart throughout their lengths, reinforcing and spacing shims interposed between the said main shims at the outer portions thereof, binding plates engaging the outer portions of the said shims, and fastening means fastening the said main shims, the reinforcing and spacing shims and the said binding plates together.

10. In a flexible coupling, the combination of coupling members adapted to be secured to the adjacent ends of two shafts, flexible connecting members connecting the said coupling members with each other and projecting beyond the outer sides thereof, and a floating member made in sections and inclosing the said coupling members, the said projecting ends of the flexible connecting members engaging the sides of the said floating member, the adjacent edges of the sections of the said floating member being provided with interlocking tongues and grooves to hold the sections against circumferential displacement one relative to the other.

WILLIAM J. FRANCKE.